United States Patent [19]
Rickard et al.

[11] Patent Number: 5,802,724
[45] Date of Patent: Sep. 8, 1998

[54] COUPLING FOR SPLIT-BOOM POWER TOOL

[75] Inventors: Harry Gene Rickard; Kenneth M. Brazell, both of Phoenix; Robert G. Everts, Chandler, all of Ariz.

[73] Assignee: Ryobi North America, Anderson, S.C.

[21] Appl. No.: 688,036

[22] Filed: Jul. 26, 1996

Related U.S. Application Data

[63] Continuation-in-part of Ser. No. 303,320, Sep. 9, 1994, abandoned.

[51] Int. Cl.⁶ .................................................. B26B 27/00
[52] U.S. Cl. ............................................ 30/296.1; 30/276
[58] Field of Search ................................ 30/296.1, 276, 30/122; 74/502.4, 502.6; 56/12.7; 172/41

[56] References Cited

U.S. PATENT DOCUMENTS

| | | | |
|---|---|---|---|
| 2,817,548 | 12/1957 | Uthemann | 403/104 |
| 4,122,601 | 10/1978 | Katsuya | 30/276 X |
| 4,430,017 | 2/1984 | Stefancich | 403/104 |
| 4,463,498 | 8/1984 | Everts | 30/296.1 |
| 4,505,040 | 3/1985 | Everts | 30/296.1 |
| 4,596,484 | 6/1986 | Nakatani | 403/104 |
| 4,654,971 | 4/1987 | Fettes et al. | 30/383 |
| 4,733,471 | 3/1988 | Rahe | 30/276 |
| 4,760,646 | 8/1988 | Siegler | 30/382 |
| 4,899,446 | 2/1990 | Akiba et al. | 30/296.1 X |
| 4,991,298 | 2/1991 | Matre | 30/392 |
| 5,013,282 | 5/1991 | Keller | 464/172 |

*Primary Examiner*—Maurina T. Rachuba
*Attorney, Agent, or Firm*—Brooks & Kushman P.C.

[57] ABSTRACT

A split-boom power tool includes a housing adapted to carry a battery or motor. A first boom member connected to the housing includes an electromechanical or mechanical joint (i.e., coupling) connected thereto for receiving a second boom member, which carries an attachment. The attachment may include a hedge trimmer, line trimmer, pruner, blower, or extension. Various couplings or mechanical joints are provided.

16 Claims, 8 Drawing Sheets

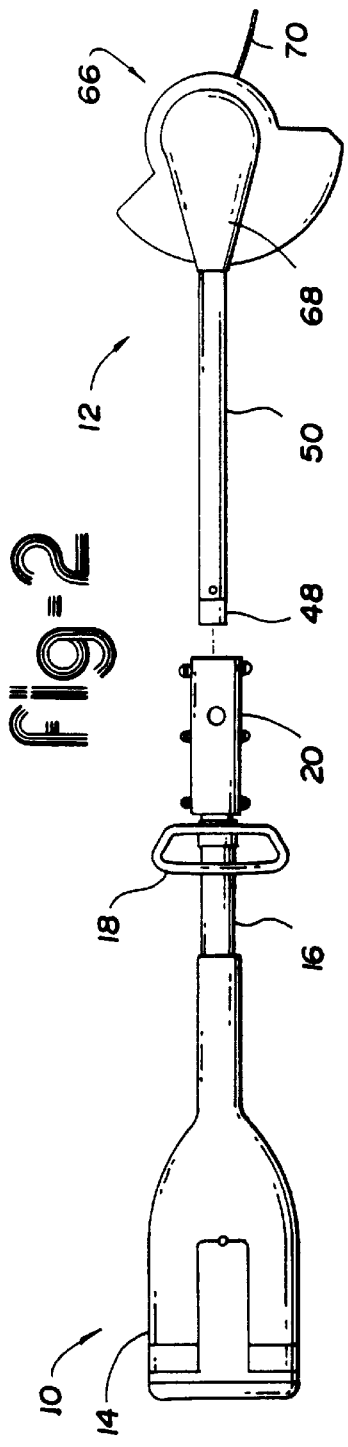
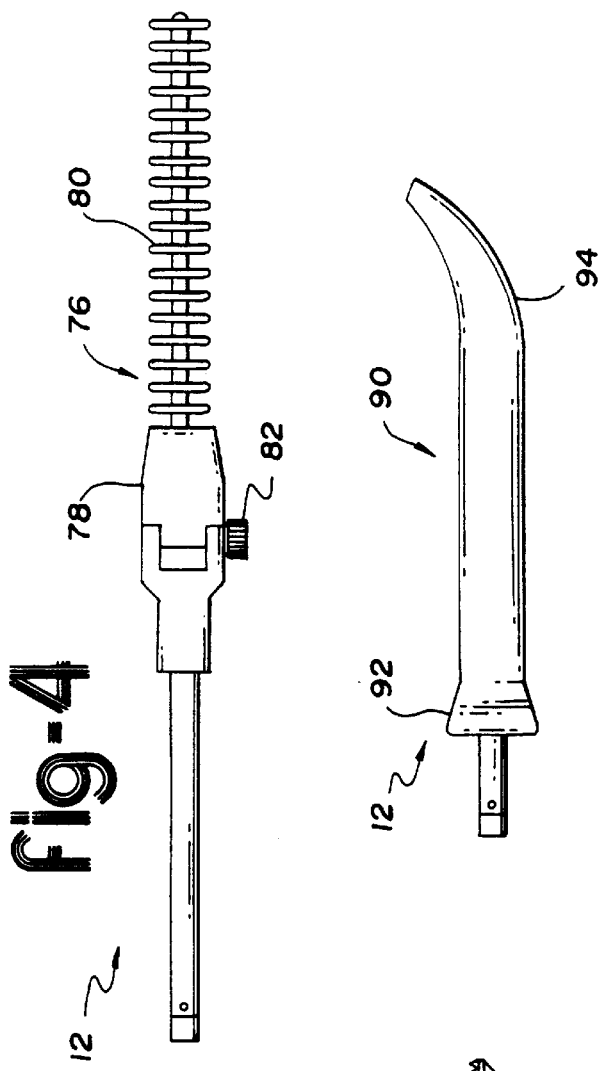
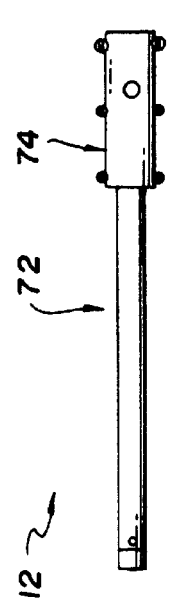
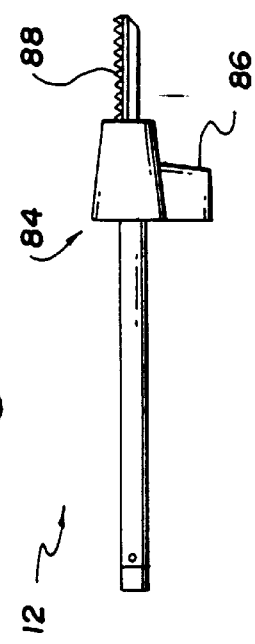
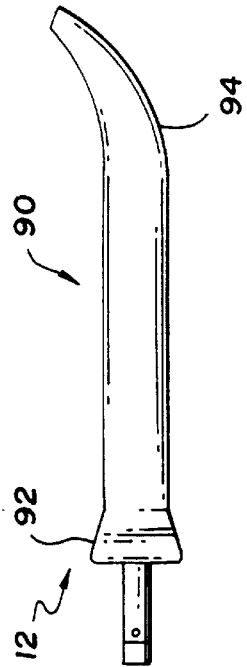

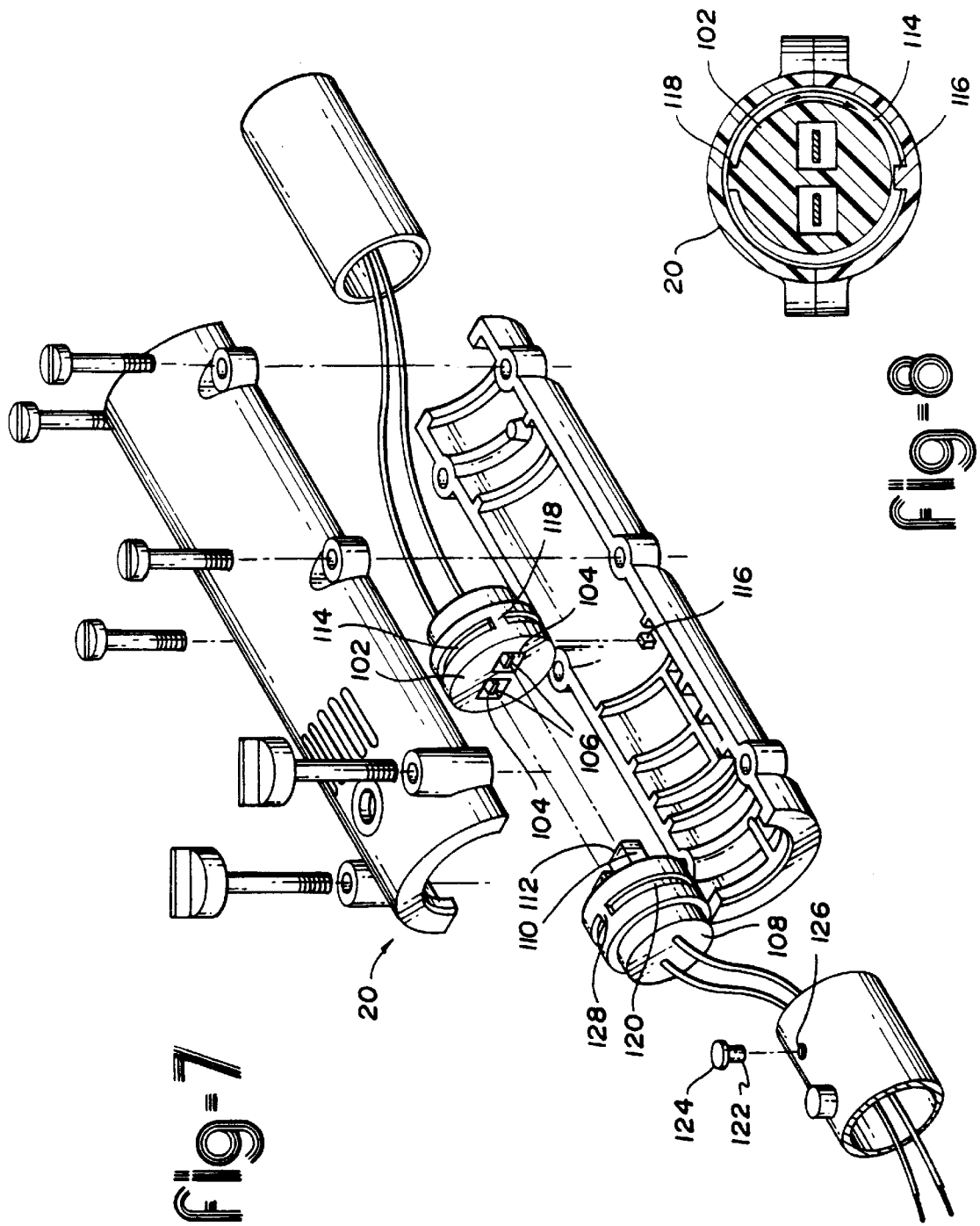

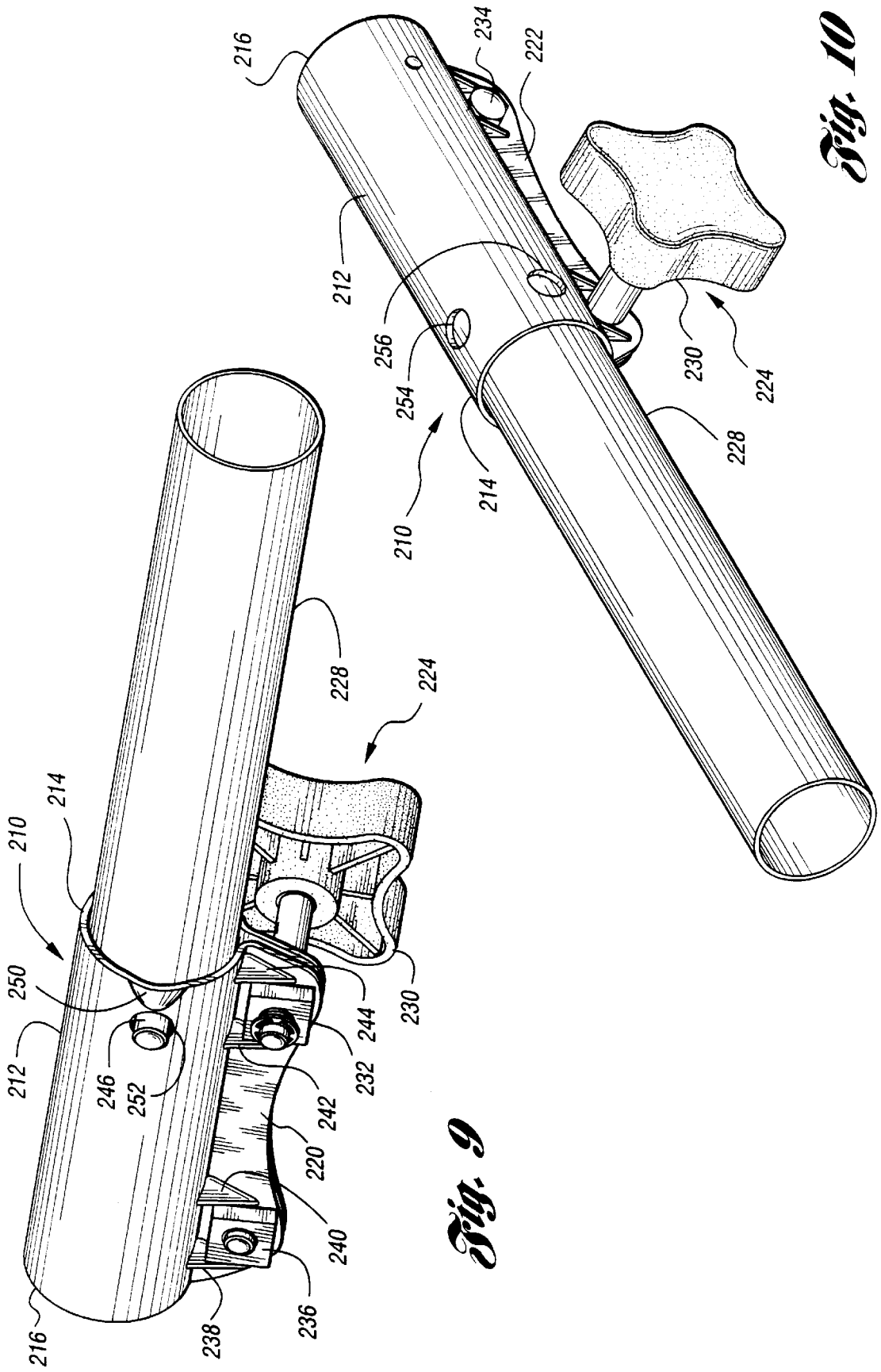

COUPLING FOR SPLIT-BOOM POWER TOOL

CROSS-REFERENCE TO RELATED APPLICATION

This application is a continuation-in-part of U.S. patent application Ser. No. 08/303,320, filed Sep. 9, 1994, entitled "Attachment System for Battery Powered Tool", which has been abandoned in favor of pending U.S. Ser. No. 08/703,686, which is assigned to the assignee of the present application, and which is hereby incorporated by reference.

TECHNICAL FIELD

The present invention relates to a portable system adaptable to receive a line trimmer, a hedge trimmer, a pruner, a blower, an extension, etc., and more particularly to a coupling for a split-boom power tool.

BACKGROUND ART

Portable line trimmers, blowers, pruners, and hedge trimmers are well known in the art. Examples of such systems include those disclosed in U.S. Pat. No. 4,884,314, which discloses a portable retractable battery operated blower for removing light debris from sidewalks or driveways. U.S. Pat. No. 4,413,371 discloses a blower attachment for a portable power unit. U.S. Pat. No. 4,089,114 discloses a cordless electric lawn edger having a flexible strand of nylon monofilament rotated at high speed to effect cutting of grass and weeds. U.S. Pat. No. 4,237,610 discloses a portable electrically energized, cordless grass trimmer having a rotatable hub which is adapted to alternatively mount a flexible cutter strip, a line cutter and mechanical counter balance.

Many of these systems work efficiently and provide the desired result of cutting, trimming or blowing. However, it is desirable to develop a system which is adaptable to selectively achieve all of these results while remaining portable, lightweight and easy to use.

U.S. Pat. No. 4,876,490 discloses an electric motor drive system for hand guided tools which attempts to provide this selective capability, in particular for garden appliances but also for tools used at home such as drills and the like. However, this system is awkward because it requires the user to wear a battery-carrying power pack over the user's back, or around the user's waist. This renders the system uncomfortable and impractical.

Non-electric shaft-drive, split-boom systems are also available with various removable attachments, and with some such systems, it may be difficult or awkward to remove and replace attachments. Accordingly, it is desirable to provide a coupling for use with any such split-boom power tool which is inexpensive to manufacture and allows easy insertion of attachments.

DISCLOSURE OF THE INVENTION

A battery powered tool includes a housing adapted to carry a battery. A first boom member having first and second ends is connected to the housing at the first end thereof. A handle is provided on either the first boom member or the housing. A first mechanical joint is adapted for rotatably receiving and supporting an attachment. The first mechanical joint is mounted at the second end of the first boom member. A first electrical connector is contained within the first mechanical joint and is adapted to cooperate with a second electrical connector in the attachment to provide electric current thereto. A first electrical conductor extends within the first boom member from the housing to the first electrical connector for carrying electric current from the battery to operate the attachment. A second electrical connector is adapted for engagement with the first electrical connector, and is connected to a second boom member. A second electrical conductor extends within the second boom member, and the other end of the second boom member carries a hedge trimmer, a line trimmer, a pruner, a blower or an extension.

The present invention also provides a coupling for use with any split-boom power tool. The coupling comprises a substantially cylindrical joint having first and second ends, the joint being compressible for reducing the cylindrical diameter of the joint for attachment. First and second flanges extend from the joint, and a first tightening member cooperates with the first and second flanges for selectively decreasing the diameter of the joint at the first end of the joint. The joint includes an aperture formed therethrough for cooperation with the resiliently biased locating pin on the second boom member. The first tightening member is operative to squeeze the first and second flanges together to decrease the cylindrical diameter to rigidly secure the second boom member within the joint. Various coupling embodiments are provided, and are used with shaft-drive tools, or otherwise.

Accordingly, an object of the present invention is to provide a coupling which is inexpensive to manufacture and allows easy insertion of attachments for rigid connection to the first boom member.

Another object is to provide a coupling which allows removal of attachments by loosening of a single knob.

These and other objects, features and advantages of the present invention will be more thoroughly understood with reference to the accompanying drawings and description.

BRIEF DESCRIPTION OF THE DRAWINGS

FIG. 2 is a plan view of a battery-powered tool according to the present invention, including a line trimmer;

FIG. 3 is a plan view of an extension for an attachment system according to the present invention;

FIG. 4 is a plan view of a hedge trimmer attachment according to the present invention;

FIG. 5 is a plan view of a pruner attachment according to the present invention;

FIG. 6 is a plan view of a blower attachment according to the present invention;

FIG. 7 is an exploded perspective view of a second embodiment of a mechanical joint and attachment according to the present invention;

FIG. 8 is a vertical cross-sectional view of a second embodiment of a mechanical joint and attachment according to the present invention;

FIG. 9 shows a perspective view of a third embodiment of a mechanical joint or coupling in accordance with the present invention;

FIG. 10 shows a reverse perspective view of the coupling assembly shown in FIG. 9;

BEST MODE FOR CARRYING OUT THE INVENTION

Figure 1:
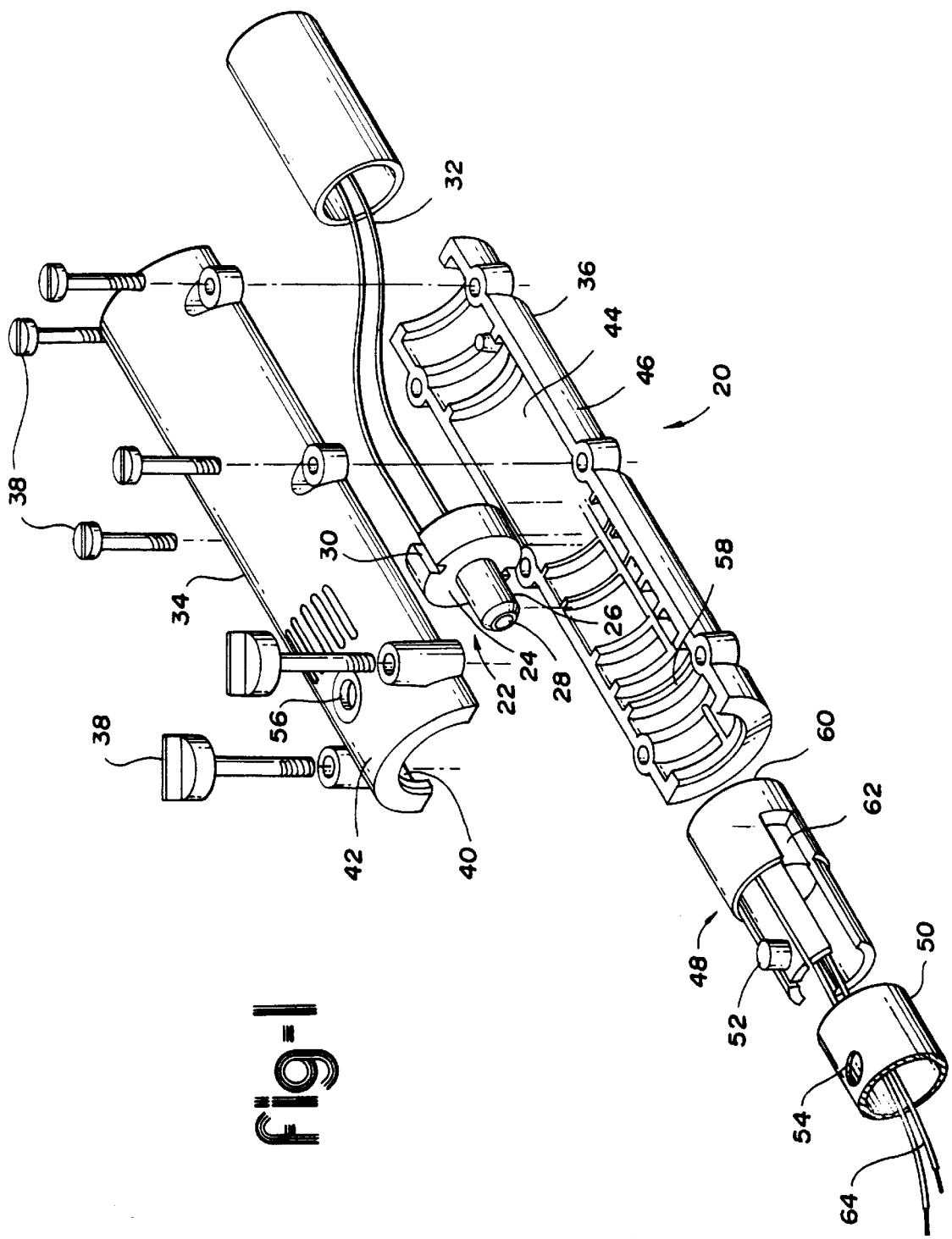
FIG. 1 is an exploded perspective view of a mechanical joint and attachment according to the present invention.

Referring to FIGS. 1 and 2, a battery powered tool 10 is shown according to the present invention. The tool 10 is adapted to selectively receive attachments 12. The tool includes a housing 14 adapted to carry a battery. A first boom member 16 having first and second ends is connected to the housing 14 at the first end thereof. A handle 18 is connected to the first boom member 16. A first mechanical joint 20 is connected to the second end of the first boom member and adapted for rotatably receiving and supporting the removable attachments 12. A first electrical connector 22 is contained within the first mechanical joint 20 and is adapted to cooperate with a second electrical connector in the attachment 12 to provide electric current thereto. A first electrical conductor 24 extends within the first boom member 16 from the housing to the first electrical connector 22 for carrying electric current from the battery to operate the attachment 12.

The first electrical connector 22 includes a generally cylindrical base 24, and a body member 26 connected thereto along a central cylindrical axis. The connector body member 26 has a cylindrical bore therethrough having a cylindrical electrical contact member 28 press-fit therein. The cylindrical contact member 28 is a female-type contact adapted for receiving a male contact, wherein the contacts are adapted to rotate respectively while maintaining electrical contact therebetween. The connector base 24 has a slot 30 formed thereon for cooperation with a rib extending from the first mechanical joint 20. This slot 30 prevents rotation of the first electrical connector 22 with respect to the first mechanical joint 20. This configuration allows the male electrical contact member to rotate with respect to the female first electrical contact member to prevent twisting of the first electrical conductor 32 when the attachment 12 is rotated with respect to the first mechanical joint 20.

The first mechanical joint 20 includes first and second generally half-cylindrical shaped cover plates 34, 36 held together by screws 38. The first plate 34 has inner and outer sides 40, 42, and the second plate 36 has inner and outer sides 44, 46. The two plates are connected together so as to hold the first electrical connector 22 therebetween. A second end of the first boom member 16 is held between an end of the cover plates 34, 36, in order to secure the first mechanical joint with respect to the first boom member.

The attachment 12 includes a second mechanical joint 48 connected to a second boom member 50. The second mechanical joint 48 has a locating pin 52 resiliently connected thereon. The locating pin 52 is adapted to cooperate with an aperture 54 formed in the second boom member 50 to secure the second mechanical joint with respect to the second boom member. The locating pin 52 is adapted to further cooperate with a hole 56 formed in the first plate 34 in order to secure the attachment with respect to the first mechanical joint. The locating pin 52 is further adapted to cooperate with a channel 58 formed on the inner sides 40, 44 of the first and second plates. By depressing the locating button 52 below the opening 56 formed in the first plate, the user may twist the attachment 12 with respect to the first mechanical joint. As the attachment is twisted, the locating pin 52 cooperates with the channel 58 to allow rotational movement of the attachment with respect to the first mechanical joint while preventing detachment of the attachment from the first mechanical joint. A male electrical contact member 60 is adapted for selective mating within the female contact member 28. The male contact 60 is contained within the second electrical connector 62, which secures the male contact 60 with respect to the attachment. This facilitates continuous electrical contact between the first and second electrical connectors as the attachment is rotated with respect to the first mechanical joint and the locating pin 52 cooperates with the channel 58. A second electrical conductor 64 carries electric current from the second electrical connector 62 to the work tool. As shown in FIGS. 2–6, the work tool is either a line trimmer 66, an extension 72, a hedge trimmer 76, a pruner 84, or a blower 90.

Referring to FIG. 2, the line trimmer 66 includes a motor housing 68, an electric motor mounted within the motor housing, and a flexible strand 70 operatively connected to the electric motor and extending outwardly from the motor housing. In operation, electric current from the battery in the housing 14 travels through the first electrical conductor, the first electrical connector, the second electrical connector, and the second electrical conductor to the electric motor. This electric current operates the electric motor, which actuates rotational movement of the flexible strand 70. In this configuration, the tool may be used for trimming grass, weeds, etc.

As shown in FIG. 3, the extension 72 includes a third connector 74 mounted at the second end of the second boom member for extending the length of the tool. The third connector 74 is adapted to receive and support any of the second mechanical joints 48 of the attachments herein disclosed. The extension 72 is particularly useful with the hedge trimmer 76 and the pruner 84 attachments. This extension enables the user to trim high bushes or to prune high branches. Furthermore, more than one extension may be added to the tool to significantly increase the length of the tool. The extension is designed so that more than one unit may be fitted together.

Referring to FIG. 4, the hedge trimmer 76 includes a motor housing 78, and a hedge trimmer blade 80 operatively connected to the electric motor and extending outwardly from the motor housing. The hedge trimmer further includes a knob 82 for adjusting the angle of the blade 80 relative to the second boom member to provide different angles for different hedge trimming needs. For example, when trimming high bushes, the user may adjust the knob 82 so that an angle of approximately 60° exists between the blade 80 and the second boom member. This enables the user to trim the top portion of bushes more easily.

As shown in FIG. 5, the pruner 84 includes a motor housing 86, an electric motor within the housing, and a pruner blade 88 operatively connected to the electric motor and extending outwardly from the motor housing. This attachment is generally used for pruning branches or limbs from a plant or tree.

Referring to FIG. 6, the blower 90 includes a motor housing 92, an electric motor within the housing, a blower fan operatively connected to the motor, and a blower tube 94 operatively connected to the motor housing for directing air from the blower fan to a desired location outside the system for blowing leaves or debris.

It can be appreciated that this attachment system is adaptable for use with existing wall-hanging battery chargers. These wall mounted battery chargers may receive the housing 14 and provide a voltage differential thereto for recharging the battery. This provides a convenient and safe storage device for the tool.

An alternative embodiment of the first and second electrical connectors is shown in FIGS. 7 and 8. The alternative first electrical connector 102 includes rectangular sockets 104 with contact prongs 106 disposed therein. The second electrical connector 108 includes extension plugs 110 adapted for cooperation with the sockets 104. The extension plugs 110 include female contact channels 112 therein adapted for cooperation with the contact prongs 106 of the first electrical connector. The first electrical connector 102 includes a channel 114 for cooperation with a boss 116 extending from the inner side of the second plate. This boss 116 cooperates with the channel 114 to allow rotational movement of the first electrical connector 102 with respect to a first mechanical joint. The dog 118 prevents the first electrical connector from rotating more than 360° with respect to the first mechanical joint. By preventing rotation in excess of 360°, the first electrical conductor wires are prevented from twisting, tangling, and breaking.

Similarly, the second electrical connector 108 includes a channel 120 for cooperation with a boss 122. The boss 122 is a part of push pin 124, which is adapted to cooperate with a hole 126 formed in the second boom member. The hole 126 is slightly chamfered in order to pinch and hold the push pin 124 when the push pin is forced into the hole 126 after the second electrical connector 108 has been inserted into the second boom member and the channel 108 has been aligned with respect to the hole 126. The boss 122 cooperates with the channel 120 to allow rotational movement of the second electrical connector 108 with respect to the second boom member, while preventing movement of the second electrical connector fore and aft along the central axis of the second boom member. The dog 128 of the second electrical connector 108 prevents rotation of the second electrical connector with respect to the second boom member in excess of approximately 360°. As a result of this configuration, a stack-up of selective rotational capability occurs and enables the second boom member to rotate nearly 720° with respect to the first mechanical joint. In other words, the first electrical connector 102 may rotate up to approximately 360° with respect to the first mechanical joint, as limited by the first dog 118, and the second electrical connector 108 is allowed to rotate up to approximately 360° with respect to the second boom member, as limited by the second dog 128, thus resulting in potential rotational movement of up to approximately 720° between the first mechanical joint and the second boom member.

FIG. 8 shows a vertical cross-section of the first electrical connector 102 and the first mechanical joint 20. As shown, the boss 116 cooperates with the channel 114 to allow rotation of the first electrical connector 102 with respect to the first mechanical joint. The dog 118 cooperates with the protrusion 116 to prevent rotational movement of the first electrical connector 102 in excess of 360° with respect to the first mechanical joint 20. In this manner, the user may adjust the relative angle of the tool with respect to the handle and housing. This adjustment capability provides the user with flexibility in adjusting the tool for convenient operation thereof.

Figure 11:
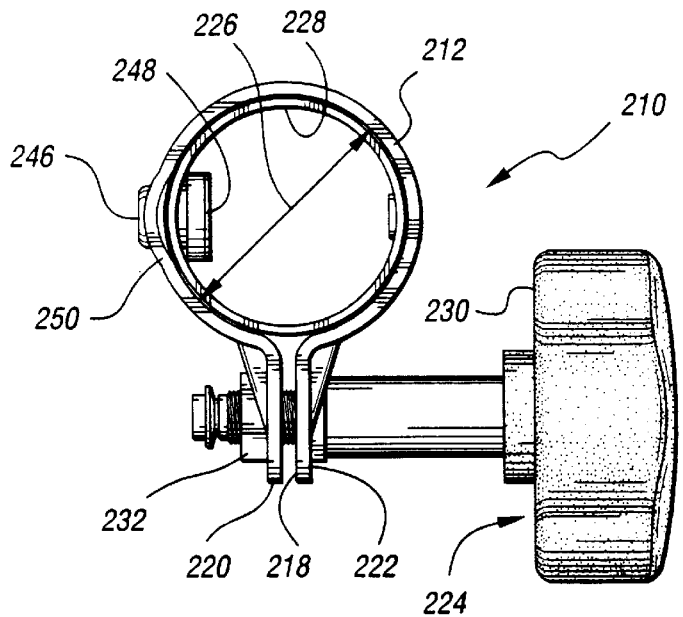
FIG. 11 shows an end view of the assembly shown in FIG. 9.
Figure 15:
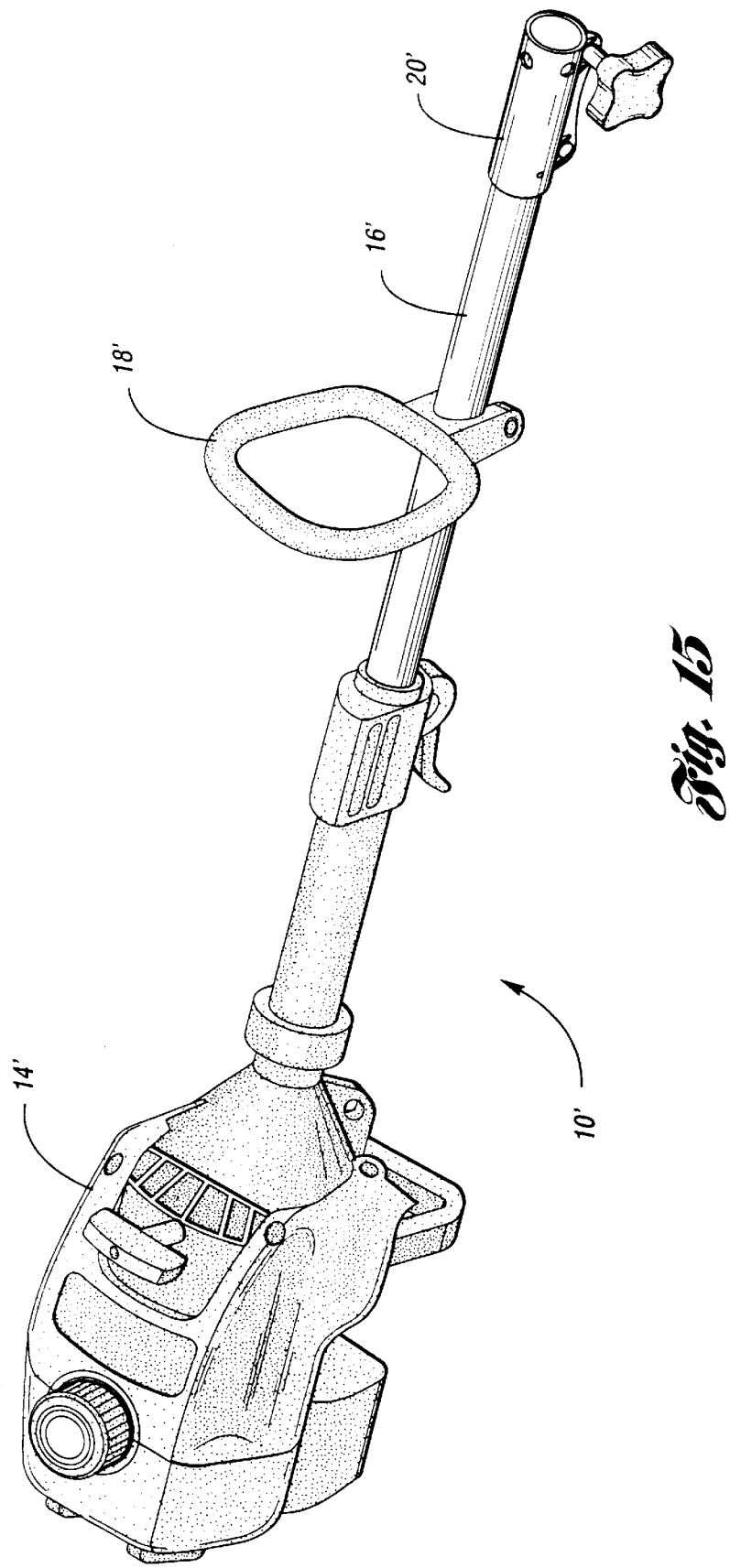
FIG. 15 shows a perspective view of an engine-driven split-boom power tool for use with the couplings illustrated in FIGS. 9–14.
Figure 16:
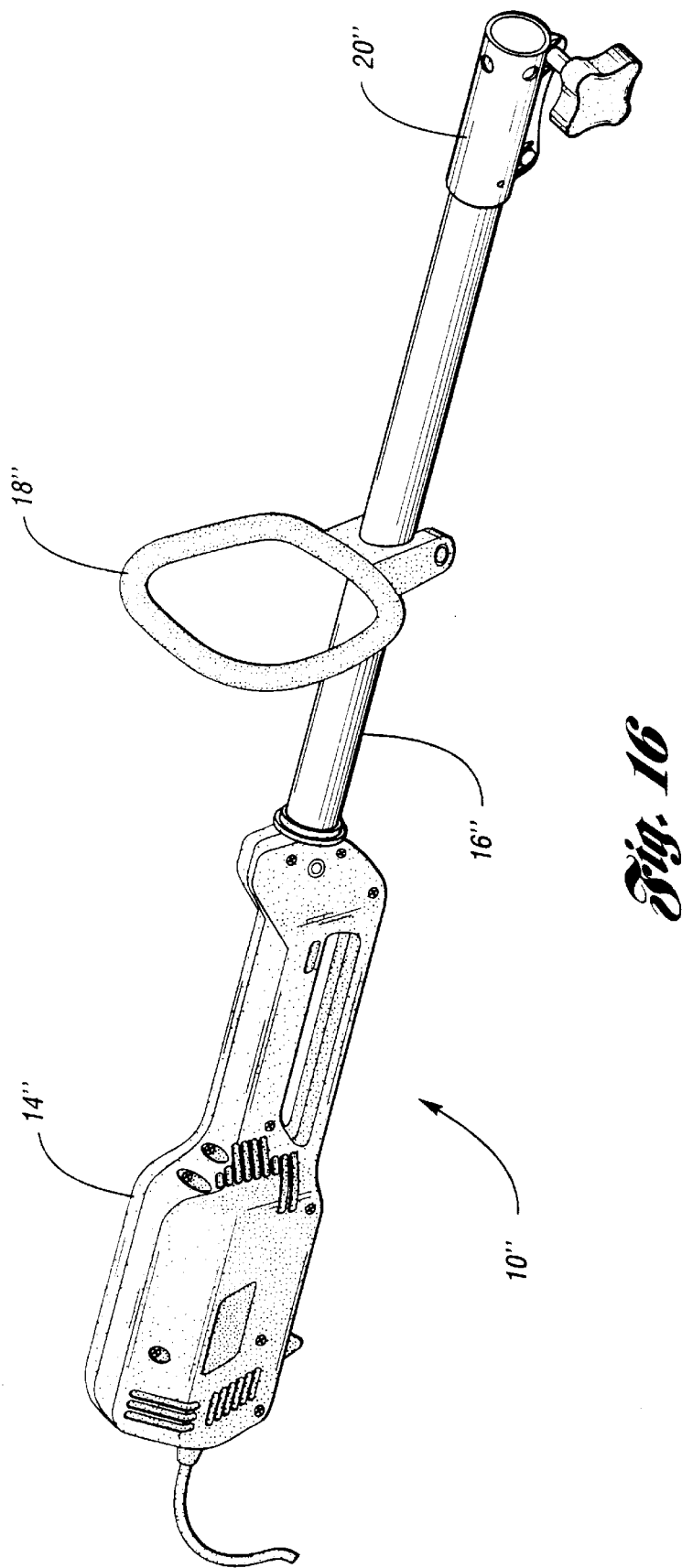
FIG. 16 shows a perspective view of an engine-driven split-boom power tool for use with the couplings illustrated in FIGS. 9–14.

FIGS. 9–11 show a third embodiment of a mechanical joint (or coupling) 210 in accordance with the present invention. The coupling 210 may be used with any split-boom power tool, and is preferably used with shaft-drive split-boom power tool, as illustrated in FIGS. 15 and 16. The power tool 101 illustrated in FIG. 15 comprises an engine housing 14', a handle 18', and a first boom member 16' secured to coupling 20', which receives a second boom member (not shown).

Similarly, the power tool 10" illustrated in FIG. 16 comprises an electric motor housing 14", a handle 18", and a first boom member 16" secured to a coupling 20", which receives a second boom member (not shown).

The coupling 210 of FIGS. 9–11 comprises a substantially cylindrical single piece joint 212 having first and second ends 214, 216, respectively. The joint 212 is configured to form a compressible gap 218 between two flanges 220, 222 which extend from the joint 212. The single-piece design reduces manufacturing costs and reduces parts count. A first tightening member 224 is provided in cooperation with the first and second flanges 220, 222 for selectively decreasing the cylindrical diameter 226 of the joint 212 at the first end 214 of the joint 212 for squeezing the joint 212 against the second boom member 228 to rigidly secure the second boom member 228 within the joint 212. In this embodiment, the first tightening member 224 comprises a thumbwheel screw 229 which is threaded for cooperation with the nut 232 for squeezing the flanges 220, 222 together. The second end 216 of the joint 212 is secured to the first boom member by means of the single bolt 234 and nut 236. The support gussets 238, 240, 242, 244 prevent rotation of the square nuts 232, 236 as the thumbwheel screw 229 and bolt 234 are rotated.

The second boom member 228 further comprises a resiliently biased locating pin 246 which is springloaded outward by the biasing mechanism 248. A chamfered lead-in edge portion 250 is formed adjacent the radial aperture 252 to facilitate insertion of the locating pin 46 into the aperture 252. Additional apertures 254, 256 are provided on the joint 212 so that the second boom member 228 may be rotated within the joint 212.

Accordingly, for installation of an attachment carried by the second boom member 228, the second boom member 228 is inserted into the coupling 210 in a manner such that the locating pin 246 is aligned with the chamfered lead-in edge portion 250 so that the locating pin 246 enters the aperture 252. The thumbwheel screw 229 is then rotated to squeeze the flanges 220, 222 together to decrease the cylindrical diameter 226 of the joint 212 to squeeze the second boom member 228 within the joint 212 for rigidly securing the second boom member 228 to the coupling 210. It is particularly advantageous that the operator need only loosen the single knob 230 for removal of attachments. Of course, the knob 230 could alternatively be positioned on the opposite side of the flanges 220, 222, as shown in FIGS. 15 and 16.

Figure 12:
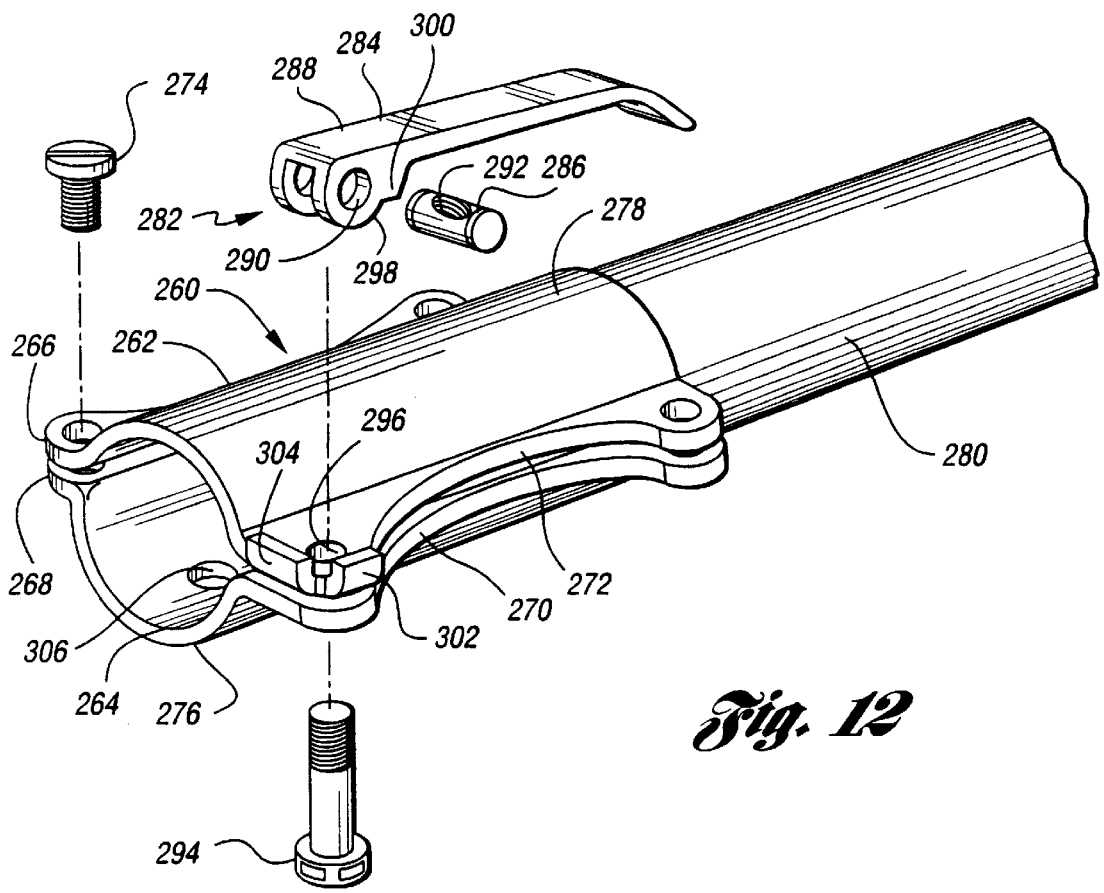
FIG. 12 shows a partially exploded perspective view of a fourth embodiment of a coupling assembly in accordance with the present invention.

A fourth coupling embodiment is shown in FIG. 12 in accordance with the present invention. This coupling 260 comprises first and second substantially half-cylindrical-shaped joint members 262, 264 which cooperate to form a cylindrical joint. The joint members 262, 264 include flanges 266, 268, 270, 272 extending therefrom for receiving attachment screws 274. The coupling 260 includes a first end 276 for receiving a second boom member, and a second end 278 for receiving the first boom member 280. The second end 278 of the coupling 260 is rigidly secured to the first boom member 280 by attachment screws (not shown) which squeeze the flanges 266, 268, 270, 272 together for attachment. The first end 276 of the coupling 260 includes a tightening member 282 for squeezing the flanges 270, 272 together for decreasing the cylindrical diameter of the coupling 260 at the first end 276 for securing the second boom member to the coupling 260. The tightening member 282 includes a lever 284 including a rod 286 in cooperation with apertures 288, 290. The rod 286 includes an aperture 292 for cooperation with the bolt 294, which extends to the aperture 296 in the flanges 270, 272 for securing the lever 284 to the coupling 260. The lever 284 includes a lower surface 298 having a flat spot or a cam lobe such that the lever 284 acts as an overcenter mechanism or a flat cam. Accordingly, as the lever 284 is pivoted toward the flanges 270, 272, the flanges 270, 272 are squeezed together, and the lower surface 298 is provided with the appropriate cam device for locking the lever 284 in the closed position. The lever 284 further comprises a lobe 300 on the lever 284 for abutment against the rib 302 to prevent spinning of the lever 284. A back rib 304 is provided for preventing rotation of the lever 284 in the reverse direction. The coupling 260 also includes at least one aperture 306 formed therethrough for cooperation with the resilient locating pin of the second boom member.

Figure 13:
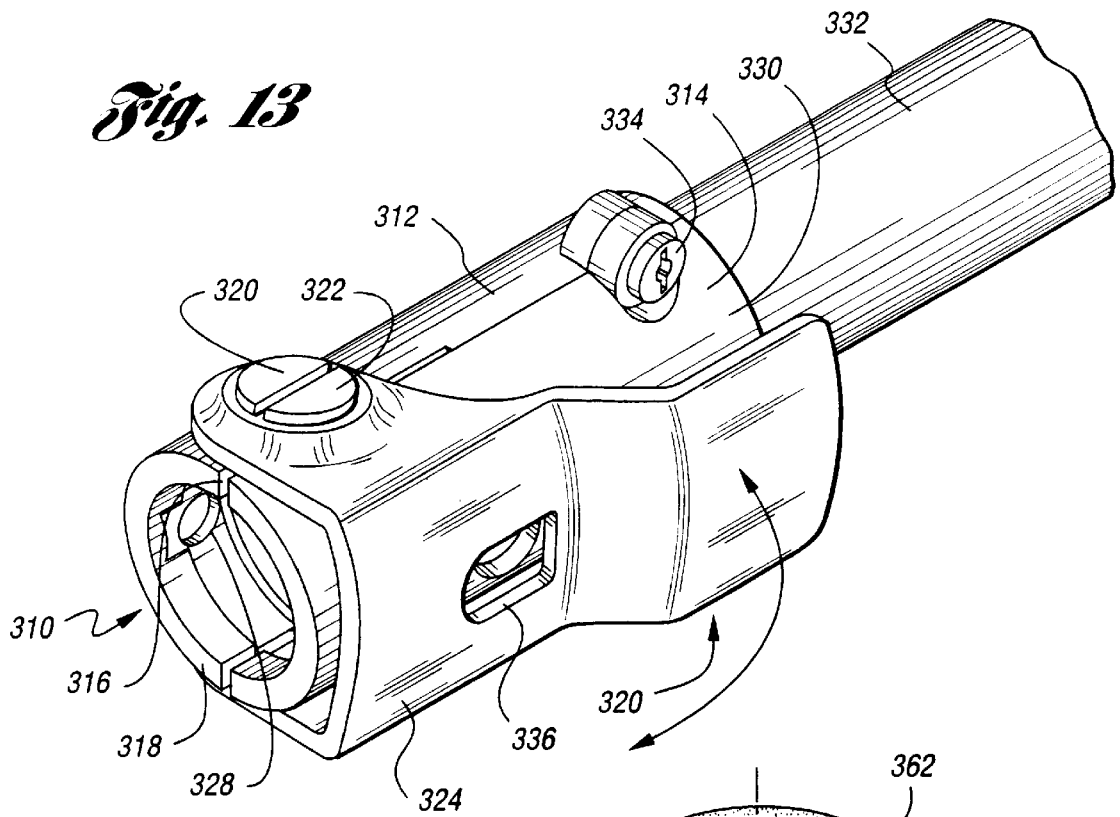
FIG. 13 shows a perspective view of a fifth embodiment of a coupling assembly in accordance with the present invention.

FIG. 13 shows a perspective view of a fifth coupling embodiment in accordance with the present invention. This coupling 310 includes first and second substantially half cylindrical-shaped joint members 312, 314 with a gap 316 formed therebetween at the first end 318 of the coupling 310. A tightening member 320 is provided at the first end 318 of the coupling 310 for squeezing the first and second joint members 312, 314 together for securing the second boom member within the coupling 310. Each joint member 312, 314 includes one-half of a split stud 320, 322 extending therefrom for cooperation with the lever 324 for squeezing the joint members 312, 314 together at the first end 318. The lever 324 includes eccentric pivot holes 326 for cooperation with the split studs 320, 322 on each side of the coupling 310. Accordingly, as the lever 322 is pivoted toward the joint member 314, the eccentric pivot holes 326 rotate to squeeze the half pivot studs 320, 322 together, thereby squeezing the joint members 312, 314 together at the first end 318 for attachment of the second boom member. The joint member 312 further includes an aperture 328 for receiving the resiliently biased locating pin of the second boom member. The second end 330 is secured to the first boom member 332 by means of the attachment screws 334. The lever 324 is preferably a stamped steel, and includes a viewing window 336 formed therein. The joint members 312, 314 are preferably diecast components.

Figure 14:
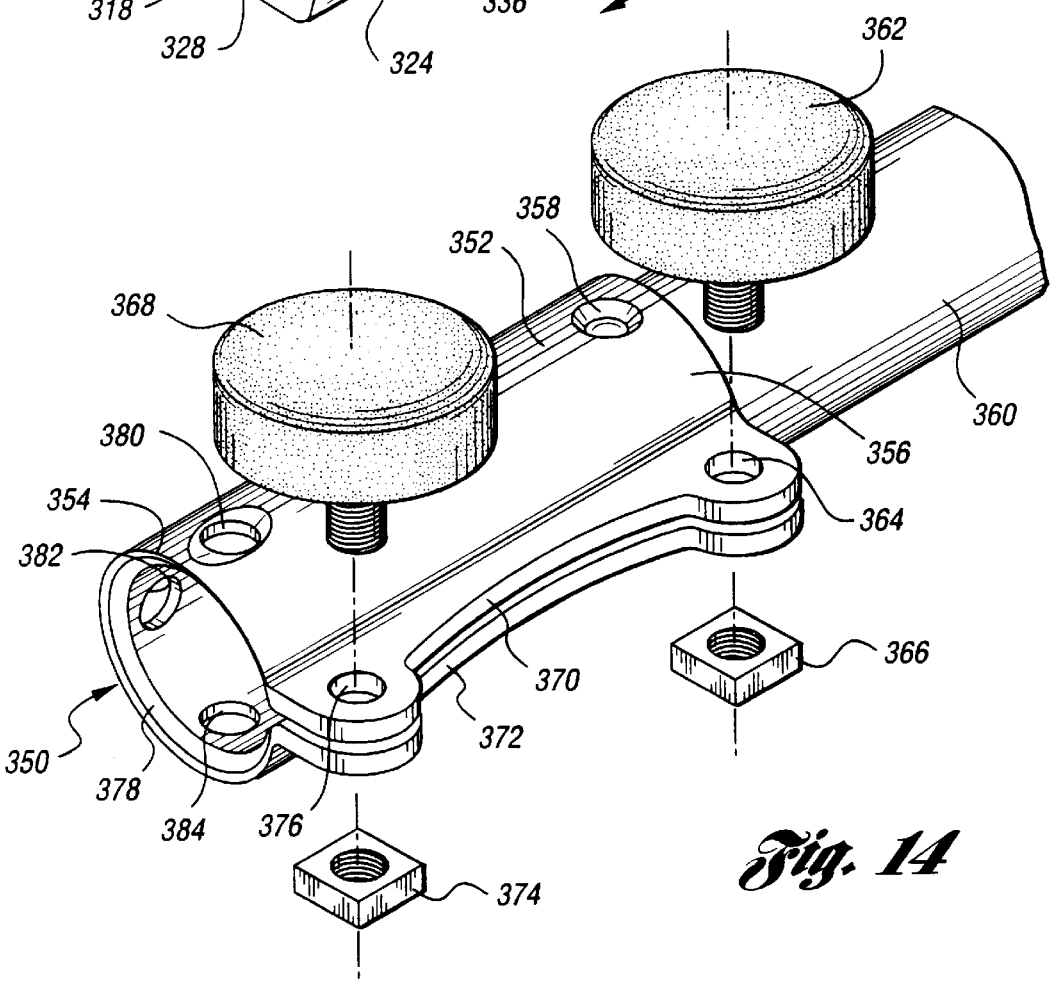
FIG. 14 shows a partially exploded perspective view of a sixth embodiment of a coupling assembly in accordance with the present invention.

A sixth alternative coupling 350 is shown in FIG. 14. The coupling 350 comprises a single piece stamped steel substantially cylindrical joint 352 having first and second ends 354, 356, respectively. A dimple 358 is formed in the joint 352 at the second end 356 for cooperation with a circumferential groove (not shown) formed in the first boom member 360. This configuration allows the coupling 350 to be rotated with respect to the first boom member 360. A first thumbwheel screw 362 is provided at the second end 356 of the coupling 350 for cooperation with the aperture 364 and nut 366 for securing the second end 356 of the joint 352 to the first boom member 360. A second thumbwheel screw 368 is provided on the first end 354 of the coupling 352 for compressing the flanges 370, 372 together in cooperation with the nut 374 and apertures 376. The first end 354 of the joint 352 further includes a circumferential tapered infeed chamfer 378 to facilitate insertion of the second boom member and resilient locating pin into the selected aperture 380, 382, 384. Accordingly, the second boom member is inserted into the joint 352 such that the pin cooperates with the selected aperture 380, 382, 384 and the thumbwheel screw 368 is rotated to compress the flanges 370, 372 together to secure the second boom member within the joint 352.

While the best modes for carrying out the invention have been described in detail, those familiar with the art to which the invention relates will recognize alternative designs and embodiments for practicing the invention as defined by the following claims.

What is claimed is:

1. An attachment system for attaching first and second boom members of a split-boom power tool, the attachment system comprising:

a coupling attachable to the first boom member and comprising a substantially cylindrical single-piece joint having first and second ends, said joint having a cylindrical diameter and being compressible for reducing the cylindrical diameter, said coupling further comprising first and second flanges extending from the joint, and a first tightening member engaged with said first and second flanges for selectively decreasing the cylindrical diameter of said joint at said first end of said joint, said cylindrical joint further comprising a radial aperture formed through a cylindrical wall of said cylindrical joint;

a resiliently biased locating pin connectable to the second boom member for engagement with said radial aperture to secure the second boom member to said coupling; and wherein said first tightening member is configured to squeeze said first and second flanges together to decrease said cylindrical diameter to rigidly secure the second boom member within said joint.

2. The attachment system of claim 1, wherein said joint further comprises a chamfered lead-in edge portion formed adjacent said radial aperture at said second end for selective cooperation with said locating pin to facilitate insertion of said locating pin into said aperture.

3. The attachment system of claim 1, wherein said joint comprises stamped steel.

4. The attachment system of claim 1, wherein said first boom member comprises a circumferential groove formed in said first boom member adjacent said second end, and said joint includes a dimple formed therein for cooperation with said groove.

5. The attachment system of claim 1, further comprising a second attachment member in cooperation with said first and second flanges adjacent said second end of said joint.

6. The attachment system of claim 1, wherein said first tightening member comprises a thumbwheel screw.

7. The attachment system of claim 1, wherein said first tightening member comprises a cam lever.

8. An attachment system for a split-boom power tool, comprising:

a housing;

a first boom member having first and second ends, and connected to the housing at the first end;

a coupling comprising first and second substantially half-cylindrical shaped joint members cooperating to form a substantially cylindrical joint having first and second ends, said substantially cylindrical joint being compressible at said first end of said joint for decreasing its cylindrical diameter, said coupling further comprising first and second flanges extending from said first and second joint members, and a first tightening member in cooperation with said first and second flanges for selectively decreasing the cylindrical diameter of said substantially cylindrical joint at said first end of said joint, said joint further comprising an aperture formed therethrough;

a second boom member in selective cooperation with said second end of said joint;

a resiliently biased locating pin connected with respect to the second boom member for selective cooperation with said aperture to secure said second boom member to said coupling; and wherein said first tightening member is operative to squeeze said first and second flanges together to decrease said cylindrical diameter to rigidly secure said second boom member within said joint.

9. The attachment system of claim 8, wherein said flanges comprise split studs having first and second halves, said first half extending from said first joint member and said second half extending from said second joint member, said split studs being compressible to decrease the cylindrical diameter of said substantially cylindrical joint; and said tightening member comprises a lever including eccentric pivot holes formed therein for receiving and compressing said split studs as the lever is pivoted about the split studs.

10. The attachment system of claim 8, wherein said joint further comprises a chamfered lead-in edge portion formed adjacent said radial aperture at said second end for selective cooperation with said locating pin to facilitate insertion of said locating pin into said aperture.

11. The attachment system of claim 8, wherein said joint members comprise stamped steel.

12. The attachment system of claim 8, wherein said first boom member comprises a circumferential groove formed in said first boom member adjacent said second end, and said joint includes a dimple formed therein for cooperation with said groove.

13. The attachment system of claim 8, further comprising a set attachment screws for securing said first and second joint members at said second end of said joint.

14. The attachment system of claim 8, wherein said first tightening member comprises a thumbwheel screw.

15. The attachment system of claim 8, wherein said first tightening member comprises a cam lever.

16. A coupling for a split-boom power tool, the split-boom including first and second boom members with a resiliently biased locating pin connected to the second boom member, the coupling comprising:

a substantially cylindrical single piece stainless steel joint having first and second ends, first and second flanges extending from the joint, and a first thumbwheel screw in cooperation with the first and second flanges for selectively decreasing the cylindrical diameter of the joint at the first end of the joint, said joint further comprising an aperture formed therethrough for cooperation with the resiliently biased locating pin to secure the second boom member to the coupling; and wherein said thumbwheel screw is operative to squeeze said first and second flanges together to decrease said cylindrical diameter to rigidly secure said second boom member within said joint.

* * * * *